United States Patent [19]

Malburg et al.

[11] 4,165,958
[45] Aug. 28, 1979

[54] APPARATUS FOR INJECTION MOLDING OF SHOE SOLES

[75] Inventors: Anton Malburg, Hermeskeil; Friedrich Koch, Achim, both of Fed. Rep. of Germany

[73] Assignee: Desma-Werke GmbH, Achim, Fed. Rep. of Germany

[21] Appl. No.: 832,047

[22] Filed: Sep. 9, 1977

[30] Foreign Application Priority Data

Mar. 5, 1977 [DE] Fed. Rep. of Germany ... 2706851[U]

[51] Int. Cl.² .................. B29H 5/12; B29H 7/08; B29C 9/00; B29F 1/00
[52] U.S. Cl. .................. 425/119; 425/129 S; 425/183
[58] Field of Search .................. 425/119, 129 S, 130, 425/138

[56] References Cited

U.S. PATENT DOCUMENTS

| | | | |
|---|---|---|---|
| 3,302,243 | 2/1967 | Ludwig | 425/119 X |
| 3,303,532 | 2/1967 | Ludwig | 425/119 X |
| 3,390,213 | 6/1968 | Rollman et al. | 425/119 X |
| 3,400,429 | 9/1968 | Ludwig | 425/119 X |
| 3,481,003 | 12/1969 | Taylor et al. | 425/119 |
| 3,500,502 | 3/1970 | Santelmann | 425/119 |
| 3,523,333 | 8/1970 | Taylor et al. | 425/119 |
| 3,574,895 | 4/1971 | McIlbin | 425/119 |
| 3,671,621 | 6/1972 | Fukuoka | 425/129 S X |
| 3,709,973 | 1/1973 | Maltby | 425/119 X |
| 3,915,608 | 10/1975 | Hujik | 425/119 |

*Primary Examiner*—J. Howard Flint, Jr.
*Attorney, Agent, or Firm*—Sughrue, Rothwell, Mion, Zinn and Macpeak

[57] ABSTRACT

Right angle arms supporting mold bottom stamps pivot about an axis at the intersection of the arms to present in sequence the bottom stamps into underlying position with respect to an upper mold and a side mold to form in sequence first and second mold cavities limited respectively by the bottom stamps to permit multiple layer, preferably polyurethane shoe soles to be molded to a prepositioned shoe last and upper which may constitute in fact the upper mold.

14 Claims, 6 Drawing Figures

APPARATUS FOR INJECTION MOLDING OF SHOE SOLES

BACKGROUND OF THE INVENTION

Field of the Invention

This invention relates to injection molding apparatus for the injection molding of shoe soles, and more particularly, to an apparatus for facilitating the manufacture of shoe soles having two or more layers, preferably of polyurethane.

The present invention is especially applicable in connection with problems involved in working with polyurethane. This material causes difficulties, above all, because the raw material is placed into the mold cavity in more or less liquid form by pouring or spraying, and the material is hardened within the mold while expanding. This calls for special attention to be placed on the sealing of the mold cavities.

Various designs of injection molding molds for the manufacture of two-layer shoe soles while molding them to the shoe upper simultaneously are in existence. In such molding processes, either the inner sole layer facing the upper can be molded first and fastened to the upper, and then the outer sole layer may be fashioned thereon, or else it is possible to mold the sole layers in reverse order. The latter procedure is employed especially when working with polyurethane.

The injection molding apparatus for working with plastics such as polyvinyl chloride which have been developed in practice in this technical field are not necessarily also suitable when working with polyurethane. However, developments in the shoe industry have been characterized by an increasing use of polyurethane. Consequently, a major concern in producing the present invention is to propose measures by means of which the equipment already on hand for working with polyvinyl chloride may be converted into apparatus suitable for working with polyurethane.

The basic task in producing the present invention is to propose a casting or injection molding apparatus of such a nature that it may be installed on equipment that is already on hand, at slight expense in making of the conversion and for the special purpose of working with polyurethane.

In order to best be able to perform this function, the apparatus of the present invention is equipped with at least two bottom stamps, each stamp being attached to a separate supporting arm, which are directed towards each other at an angle, specifically at right angles, and which intersect each other at a common swinging support. In this way, supporting arms form a rigid angle piece to the respective ends of which the bottom stamps are fastened. By swinging the angle piece through an angle of 90°, for example, about a horizontal pivot axis, the bottom stamps may be lined up with the other parts of the mold alternately. The angle piece, with the bottom stamps attached to it, may also be raised and lowered by a pressure medium cylinder acting through the pivot axis of the swinging angle piece.

The unit consisting of the bottom stamps, the angle piece, and the pivotable or swinging support may be installed in the present invention on a casting or injection molding apparatus as a single piece of equipment, preferably on the outer edge of one of the molding apparatus rotary attachments. The pressure medium cylinder and motor for driving the angle piece in rotation also properly belongs to this unit. In conformity with another proposal included in this invention, the unit may be held together by a supporting frame which is shaped like a partially open box. On the upper side of the box, the parts of the side mold may be moved laterally, while the upper mold formed by the last with the shoe upper, remains a part of the existing installation in the normal way.

It is another object of the present invention to provide a special construction of the mold, that is, of the bottom stamps that are employed in connection with the side mold to define partially the mold cavities. The bottom stamps have edge ridges running around them, and as a result, the bottom stamps take the shape of containers, shallow dishes or similar receptacles that are open at the top. The edge ridges work together with an appropriately designed projection of the side mold to form a seal and in the mold pouring position the edge ridges effect the seal with that side mold projection.

Further details of the invention are given in the following description with references to the numered parts shown on the attached diagrams included.

DESCRIPTION OF THE PREFERRED EMBODIMENT

Figure 1:
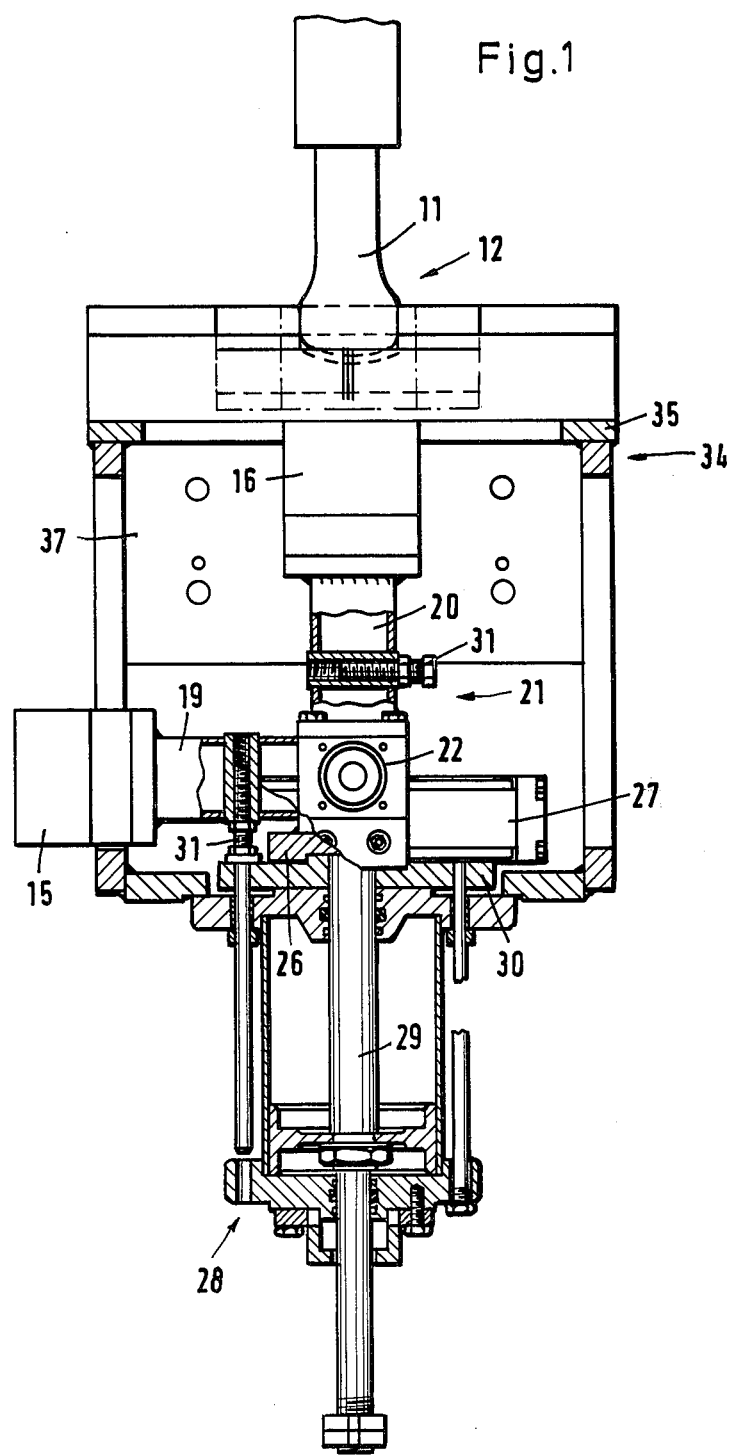
FIG. 1 is a front view, partially in section, of a unitary casting and injection molding apparatus which may be readily attached as a component part to existing shoe manufacturing equipment.

The illustrated example of the present invention is directed to an apparatus which is employed in the manufacture of two-layer shoe soles from polyurethane and for integrally molding said two-layer shoe soles to a shoe upper simultaneously therewith. The upper 10 is mounted on a last 11 and is placed with the last on a mold 12, specifically on packing washer 13 of a side mold 14 which is divided into two sections on its longitudinal intermediate plane. Mold cavities are defined by the shoe upper 10 and last 11, the closed side mold 14 and bottom stamps 15 and 16, respectively to permit a first (insole) layer 17 to be molded directly to the shoe upper 10 and a second (outer sole) layer 8 to be molded to the first (insole) layer 17 with the layers being molded in sequence, one after the other.

Figure 2:
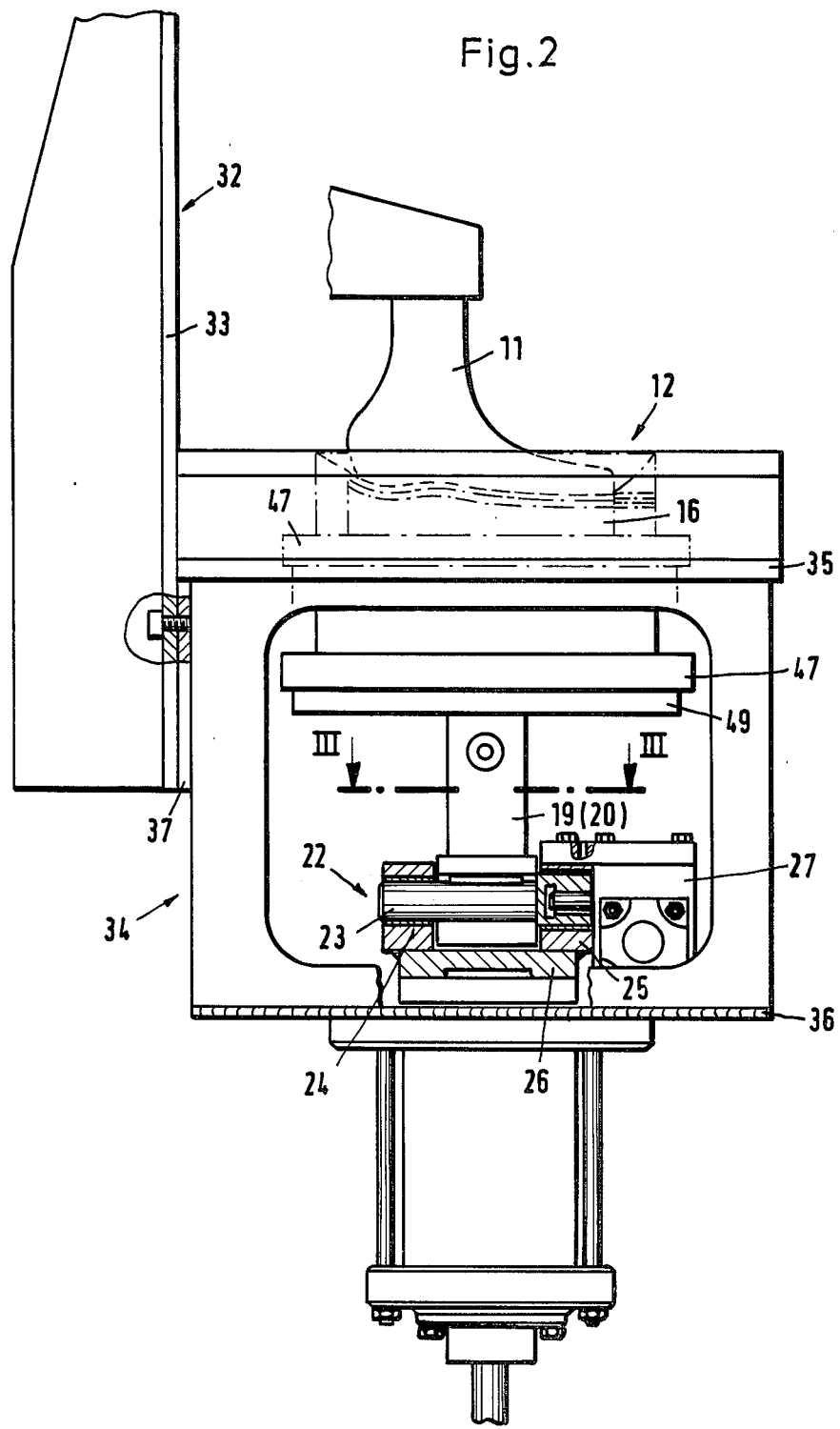
FIG. 2 is a side view of the apparatus of FIG. 1.
Figure 3:
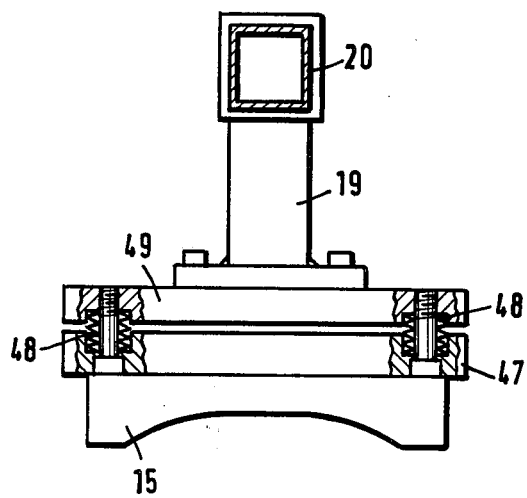
FIG. 3 is an enlarged sectional view of a portion of the apparatus of FIG. 2 taken about line III—III.
Figure 4:
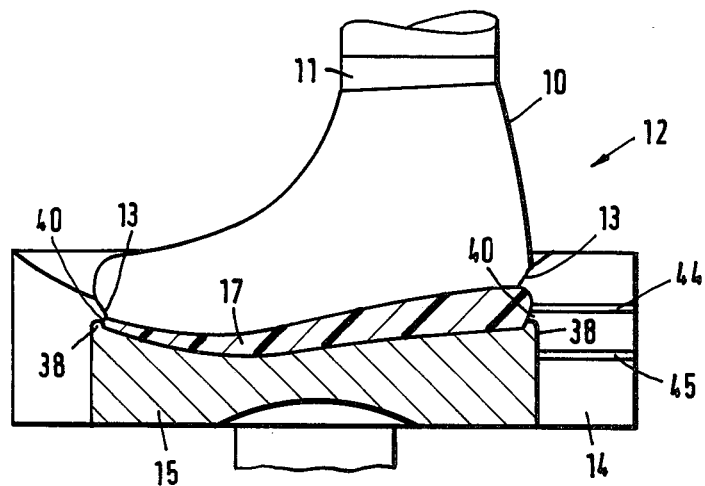
FIG. 4 is an enlarged view of the mold forming a part of the apparatus of FIGS. 1-3 inclusive, in vertical section, in condition for injection molding of the first (insole) layer.

The mold indicated generally at 12 is constructed as described above and forms a part of the apparatus of the present invention as represented in FIGS. 1, 2 and 3. For manufacturing sole layers 17 and 18 from polyurethane, the two bottom stamps 15 and 16 are required as alternating mold parts to be positioned and employed in sequence with respect to the other mold parts constituting the shoe upper 10 and last 11 and the side mold 14. Bottom stamp 16 may be provided with a special profile to form the outer sole layer 18.

Each bottom stamp is attached to an associated supporting arm, stamp 15 being attached to supporting arm 19 and stamp 16 being attached to supporting arm 20, respectively, the stamps being physically attached to the ends of the supporting arms. In the present example, the supporting arms 19 and 20 extend at right angles to each other and are connected together, FIG. 1, to form a rigid angle piece indicated generally at 21. The angle piece 21 in turn is placed so that it can swing or pivot about a horizontal axis in such a way that one or the other bottom stamps 15 or 16 may be lined up with the other parts of the mold, the stamps being shifted by swinging the rigid piece through 90°.

For this purpose the angle piece 21 is connected to a swinging support 22, the swinging support 22 consisting of a pivot pin 23 fixed to the angle piece 21 and mounted within non-rotating supporting pieces 24 and 25 acting as bearings for the pin 23. The supporting pieces 24 and 25 are fastened to a mounting plate 26 with the pivot pin 23 being driven in order to execute swinging of the angle piece 21 about the axis of the pivot pin 23, this being achieved by a motor 27 which is mounted on the supporting piece 25 and which drives the pivot pin 23.

A lifting unit in the form of a pressure medium cylinder 28 constitutes a part of the unitary assembly. In that regard, the pressure medium cylinder 28 is provided with a piston rod 29 which engages the angle piece 21 and the swinging support 22, specifically by way of mounting plate 26. By means of the pressure medium cylinder 28, the bottom stamp 15 or 16 constituting the lower element defining the mold cavity of mold 12 may selectively be raised or lowered. Accordingly, the angle piece 21, including the swinging support 22, is moved as a unit with the mounting plate 26 and the motor 27 under the lifting movements. An intermediate plate 30 which is located between the actual pressure medium cylinder 28 and the mounting plate 26 is connected with the pressure medium cylinder 28. The intermediate plate 30 serves as a relatively immovable surface sustaining pressure for an adjustable stop 31 for one of the supporting arms 19 or 20. Consequently, the swinging range of the angle piece 21 is limited by means of the stops 31. Stops 31, therefore, alternately on one side or the other contact plate 30.

The parts of the apparatus, which has been described to this point, constitute a unitary or unified assembly which may be attached to a casting or injection molding apparatus of conventional construction. In the present case, this apparatus or assembly is fashioned to the outside of a rotary attachment 32 and specifically to vertical wall 33 forming a portion of that rotary attachment. For purposes of describing the present invention, the parts belonging to the unitary assembly or apparatus are attached to a supporting frame indicated generally at 34. The supporting frame takes the shape of a box with upper and lower mounting plates 35 and 36 being provided and with the box-shaped supporting frame 34 being connected to the rotary attachment 32 by way of the joint plate 37 on one side of the frame. The parts of the assembly or apparatus, with the exception of side mold 14, are also connected to the lower mounting plate 36.

Figure 5:
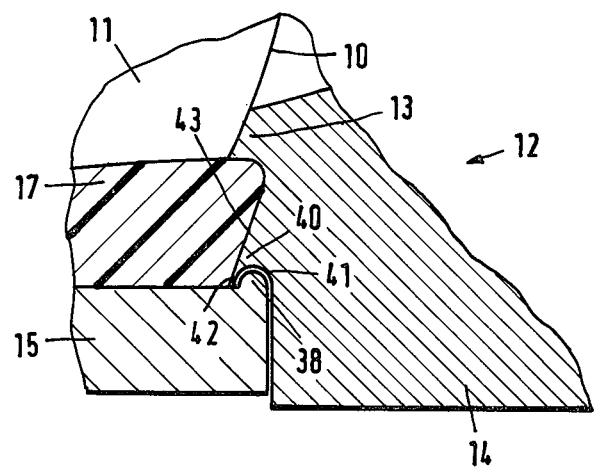
FIG. 5 is an enlarged view in section of a portion of the heel side of the mold in FIG. 4.
Figure 6:
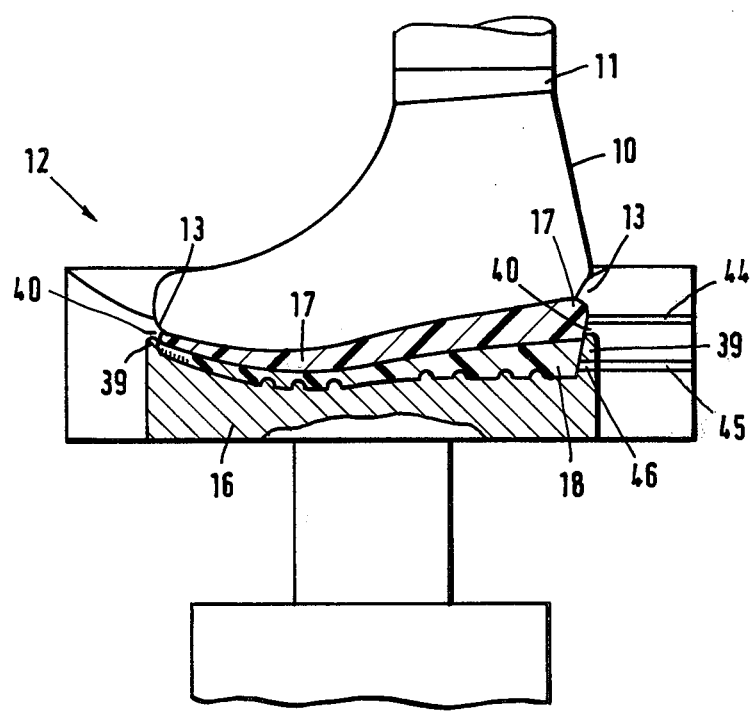
FIG. 6 is a vertical sectional view of the mold forming a part of the apparatus of FIGS. 1-3 under condition of forming the second (outer sole) layer.

The bottom stamps 15 and 16 and the side mold 14 are constructed in a special way. Both bottom stamps 15 and 16 are constructed with an edge ridge as at 38 and 39, respectively which runs around the periphery of the same. These, made as flange-shaped projections extend above the upper side of the bottom stamps 15 and 16. In the case of bottom stamp 15 for the insole layer 17, the height of edge ridge 38 is relatively small but is nevertheless considerably less than the thickness of the sole layer 17 in most of its area. On the other hand, the edge ridge 39 of bottom stamp 16 is of such a height that it is in excess of the thickness of the outer sole layer 18. Side mold 14 has a projection 40 whose surface 41, FIG. 5, points downwardly and faces bottom stamp 15 or 16 and serves as a sealing surface for the upper side of edge ridge 38 or edge ridge 39. In the example as constructed, surface 41 and the edge ridges 38 and 39 are provided with an arch shape and this is done in such a way that the edge ridges 38 and 39 fit into a recess or slot formed by the projection 40.

Construction of the parts mentioned above may be selected such that, as shown in FIG. 5, a sealing edge 42 which is pointing downwardly, of the projection 40 is formed which rests on the upper side of bottom stamp 15 when shaping and forming the insole layer 17 and forms a seal at this point. Limitation of the inner sole layer 17 at the side is provided only by an inner surface 43 of side mold 14 at this point. Alternatively, however, the sealing may also be obtained by achieving in this area a perfect fit joint by the edge ridge 38 and the surface 41 or the projection 40 with a sealing edge 42 ending at a distance above the upper side of bottom stamp 15. In that case, the edge ridge 39 of bottom stamp 16 fits into the slot enclosed by surface 41.

Pouring channels 44 and 45 are provided in the side mold for introducing material for the sole into the mold cavities that are respectively formed. Pouring channel 44 enters the mold cavity directly, on the other hand, a shaft 46 in the edge ridge 39 connects with pouring channel 45. As can be seen, this limits the lateral surface of the outer sole layer 18 to full height.

To make it easier to open the mold, the surfaces limiting sole layers 17 and 18 are shaped to converge slightly downwardly. This is true of inner surface 43 and the inside of edge ridge 39.

In order to insure a sufficiently tight seal of the bottom stamps 15 and 16 to side mold 14 in the illustrated design and specifically within certain measurement tolerances, bottom stamps 15 and 16 are fixed flexibly in such a way that certain skewing is possible. In the present case, FIG. 3, bottom stamps 15 and 16 are fixed in a holding plate 47 which, with compression springs 48 interposed relative to a counter plate 49, can be moved against the stress of the springs 48 within a certain range. The counter plate 49 is connected with supporting arm 19 or 20.

Alternatively, in another construction of the present apparatus, which is not represented in this application, it is equipped with more than two bottom stamps. That is, with three or four bottom stamps, for example. Each of these is attached to an individual supporting arm, all of which intersect each other into a common swinging support or pivot bearing. Such a design may be used for manufacturing soles consisting of more than two parts or layers, for example. With regard to the various parts of the sole, there may be areas in a shoe sole involving different materials, for example, with a poured or sprayed edge which differs from the remainder of the sole in regard to material and color, may be readily manufactured. The common swinging support or pivot bearing for the individual supporting arms may be raised and lowered in this instance, as in the illustrated embodiment of the present invention.

What is claimed is:

1. Casting or injection molding apparatus for the molding of shoe soles, preferably of polyurethane, and having two or more layers, said apparatus comprising:
   a mold including a side mold, an upper mold, and plural bottom stamps for forming at least first and second mold cavities in sequence and being limited in each case by one of the two bottom stamps, a projection being provided on the side mold and ridges being provided on the edges of the bottom stamps which interfit and form a seal with the side mold projection so as to limit the mold cavity, the bottom stamp edge ridges and the surface of the side mold projection which face said ridges being provided with corresponding arched shapes;
   a supporting arm for each bottom stamp, each supporting arm being fixed to a corresponding one of the stamps; and
   means comprising a common swinging support for supporting said arms at right angles to one another and for effecting swinging of said support arms to selectively position one of said stamps in an underlying position with respect to said side and upper molds.

2. In a molding or injection molding device for the production of double or multi-layered shoe soles, preferably for the production of double-layered shoe soles of polyurethane material, having a mold with a side form, an upper form, and two bottom stamps for the formation of at least first and second hollow chambers of the mold, each of the chambers being bordered by one of said two bottom stamps, the improvement comprising:
   two support arms arranged at a right angle to one another, to form a unified, rigid angular element;
   one of said two bottom stamps being arranged at a free end of each one of said arms across the longitudinal axis thereof;
   said side mold having a projection and each of said bottom stamps having edge ridges which interfit and form a seal with said projection of said side mold;
   a pivot mount lying beneath said mold, the angular element being pivotally mounted in said pivot mount;
   said pivot mount and said angular element being formed in such a manner that said support arm of the bottom stamp at any time associated with said mold is directed upward and the other support arm is directed in a cross direction.

3. A molding or injection molding device in accordance with claim 2 further comprising a stroke mechanism which acts on said pivot mount for raising and lowering said angular element in the direction of the support arm and bottom stamp associated with said mold, said stroke mechanism comprising a pressure means cylinder.

4. A molding or injection molding device in accordance with claim 2 wherein the axis of rotation of the pivot mount lies in the direction of the longitudinal axis of said mold or said bottom stamp.

5. A molding or injection molding device in accordance with claim 2 further comprising a motor for raising and lowering said angular element and for providing rotation drive of said angular element around said pivot mount.

6. A molding or injection molding device in accordance with claim 5 further comprising a rotation pin connected with said angular element in the area of said pivot mount, said motor providing a drive force acting upon said rotation pin.

7. A molding or injection molding device in accordance with claim 2 further comprising:
   a box-shaped support frame enclosing said side forms, said bottom stamps, said angular element, said pivot mount, said motor, and said pressure means cylinder; and
   a rotary table, said box-shaped support frame being mounted upon said rotary table.

8. In a molding or injection molding device for the production of multi-part shoe soles, preferably for the production of double-layered shoe soles from polyurethane material in a mold, having a side form, upper form, and two bottom stamps to form first and second hollow chambers each of which may be bounded by one of said two bottom stamps, the improvement comprising:
   peripheral edge ridges provided upon both of said bottom stamps and a projection provided on said side form, said ridges of said bottom stamps mating with said common projection of said side form in sealed arrangement such that the hollow chamber formed for a first intermediate sole layer is primarily bounded by the side form and the first bottom stamp and the hollow chamber formed for a bottom sole layer is bounded by the side form and said second bottom stamp.

9. A molding or injection molding device in accordance with claim 8 wherein the bottom stamp for said first intermediate sole layer is provided with an edge ridge which has a height less than the thickness of said intermediate sole layer.

10. A molding or injection molding device in accordance with claim 8 wherein the projection on the side form includes a sealing edge which is directed toward the upper surface of the bottom stamp and is formed in a bow shape.

11. A molding or injection molding device in accordance with claim 10 wherein said sealing edge lies in said sealed arrangement against the upper side of the bottom stamp during production of said intermediate sole layer.

12. A molding or injection molding device in accordance with claim 8 wherein the edge ridges and a surface of said projection are formed in a bow shape.

13. A molding or injection molding device in accordance with claim 8 wherein one of said bottom stamps has a larger edge ridge and a bore for connecting a molding channel for introduction of liquid material into the hollow chamber of the mold.

14. A molding or injection molding device in accordance with claim 8 further comprising:
   first and second counter plates, one of said counter plates being located on an end of each one of said supporting arms; and
   a plurality of compression springs arranged between each of said bottom stamps and said counter plates.

* * * * *